Dec. 1, 1942.        H. H. RUGG        2,303,503
METAL ENCLOSED SWITCHGEAR
Filed June 28, 1940
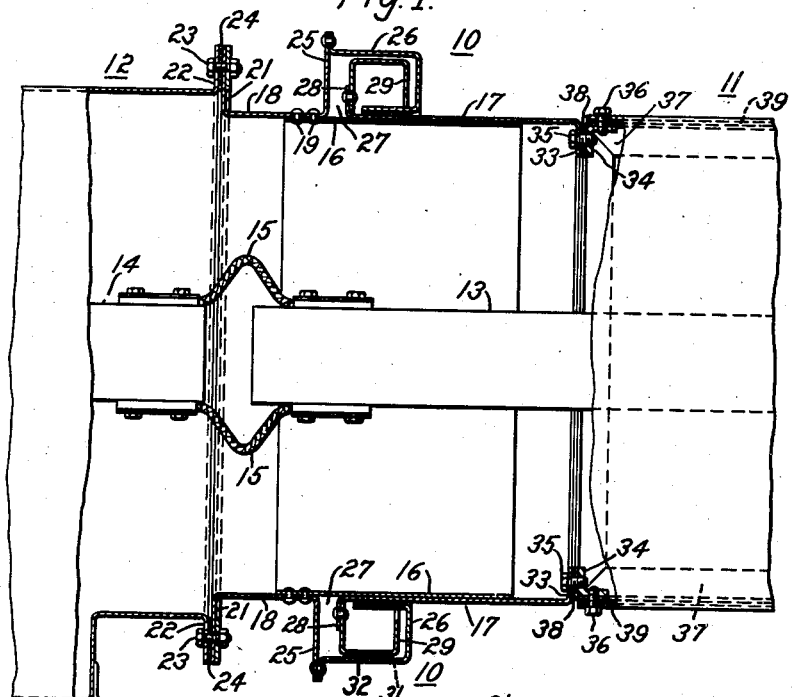
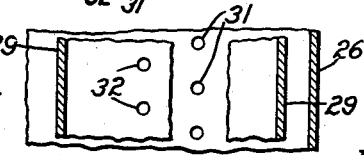
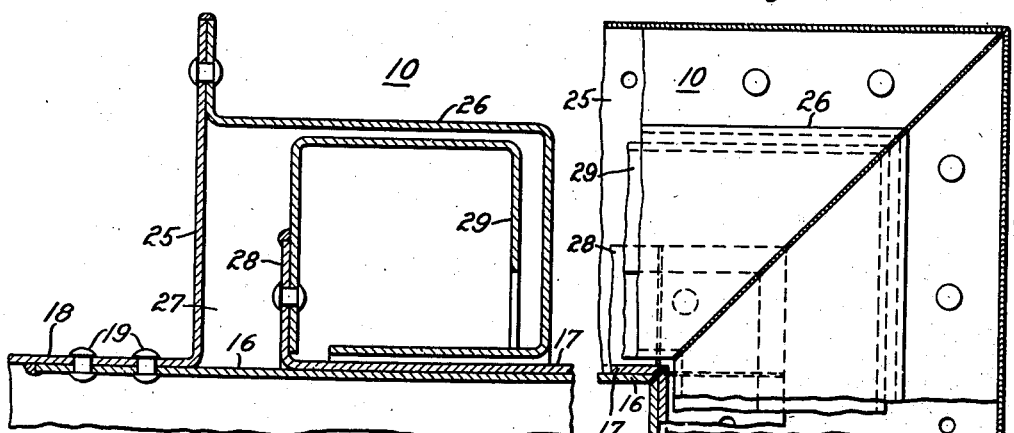
WITNESSES:
INVENTOR
Harold H. Rugg.
BY
ATTORNEY Patented Dec. 1, 1942

2,303,503

UNITED STATES PATENT OFFICE 2,303,503

METAL ENCLOSED SWITCHGEAR

Harold H. Rugg, Forest Hills, Pa., assignor to Westinghouse Electric & Manufacturing Company, East Pittsburgh, Pa., a corporation of Pennsylvania Application June 28, 1940, Serial No. 342,898

4 Claims. (Cl. 285—162)

My invention relates, generally, to metal enclosed switchgear and, more particularly, to expansion or slip joints for the metal housings enclosing the switchgear apparatus.

In the construction of metal enclosed switchgear it is frequently necessary to provide expansion or slip joints at places where there may be some relative movement or misalignment between two metal enclosures. In prior structures joints of a bellows type have been utilized for this purpose. In order to provide sufficient flexibility, such joints were made of thin metal which was weak mechanically and had a tendency to crack.

An object of my invention, generally stated, is to provide an expansion or slip joint which is simple and efficient in operation and which may be economically manufactured and installed.

A more specific object of my invention is to provide an expansion or slip joint which shall be weatherproof.

Another object of my invention is to provide an expansion or slip joint which may be formed of relatively heavy sheet metal.

A further object of my invention is to provide an expansion or slip joint for metal enclosures which may be readily inserted in or removed from the enclosures.

Still another object of my invention is to provide an expansion or slip joint for metal enclosures that will permit misalignment between the enclosures.

Other objects of my invention will be explained fully hereinafter or will be apparent to those skilled in the art.

In accordance with one embodiment of my invention, an expansion or slip joint is made by providing one of a pair of telescoping members with an external flange forming a substantially enclosed rectangle, the other of said members terminating inside of said flange in a manner forming another substantially enclosed rectangle, thereby providing a labyrinth which is weatherproof and permits both longitudinal expansion and misalignment of the members connected by the joint.

For a fuller understanding of the nature and objects of the invention, reference may be had to the following detailed description taken in conjunction with the accompanying drawing in which:

Figure 1 is a view, partially in elevation and partially in section of a joint embodying my invention and disposed between a bus-bar enclosure and a transformer housing;

Fig. 2 is an enlarged sectional view of the joint shown in Fig. 1;

Fig. 3 is a view, in end elevation of the joint shown in Fig. 2; and

Fig. 4 is an enlarged partial plan view of channel members comprising the joint.

Referring to the drawing, and particularly to Fig. 1, the structure shown therein comprises an expansion or slip joint 10 which may be utilized to connect a bus enclosure 11 to a transformer housing 12. Since the transformer is of a removable type which may be replaced by another unit in which the holes for connecting the bus enclosure may be in a slightly different position, it is necessary to provide for a certain amount of misalignment between the bus enclosure and the transformer housing. It is also necessary to provide for longitudinal expansion of the enclosure 11 in view of the expansion that may take place between bus bars 13 and 14 which are connected by flexible conductors 15 in the usual manner. Furthermore, it is necessary that the joint 10 be weatherproof to exclude moisture from the interior of the bus enclosure 11 and the transformer housing 12.

In order to accomplish the foregoing and other desirable results, I have devised the labyrinthic joint 10, shown in detail in Figs. 2 and 3. As shown, the joint 10 comprises a pair of telescoping sleeves 16 and 17 which are disposed between the bus enclosure 11 and the transformer housing 12 to permit relative movement therebetween. The sleeve 16 may be connected to the housing 12 by means of a member 18 that is secured to the sleeve by rivets 19 or in any other suitable maner. The member 18 is provided with an outwardly extending flange 21 that is bolted to a flange 22 on the housing 12 by bolts 23, a gasket 24 being interposed between the flanges 21 and 22.

Another outwardly extending flange 25 may be also provided on the member 18 and a member 26 riveted or otherwise secured to the outer edge of the flange 25. The member 26 is so shaped that it and the flange 25 form a substantially enclosed rectangle, sufficient space 27 being left between the one end of the member 26 and the flange 25 to permit the desired longitudinal movement between the telescoping sleeves 16 and 17.

The sleeve 17 may be provided with a flange 28 disposed in the space 27 between the free end of the member 26 and the flange 25. A member 29 is riveted, or otherwise secured, to the flange 28 and is so shaped that it and the sleeve 17 form another substantially enclosed rectangle, the end of the member 29 terminating inside of the rectangular flange formed by the members 25 and 26 on the sleeve 16.

In this manner a labyrinthic joint is provided through which it is practically impossible for moisture to enter the inside of the bus enclosure. In the event that water should enter between the member 26 and the sleeve 17 at either side or on top of the joint, which is rectangular in shape, it will run to the bottom side of the joint where holes 31 and 32 are provided in the members 26 and 29, respectively, as shown in Fig. 4, to drain the water from the joint. As an additional precaution against moisture entering the bus enclosure through the joint 10, the edges of all riveted joints are welded or soldered after riveting, as shown in Fig. 2. As shown in Fig. 3 the corners of the joint are made watertight by welding all seams between the mitered ends of the joint members.

In order that the joint 10 may be connected to the bus enclosure 11 without interfering with the assembly of the joint members, the sleeve 17 is provided with an internal flange 33 on the end opposite the flange 28. As shown in Fig. 1 the flange 33 is bolted to an angle member 34 by tap bolts 35. The sides of the bus enclosure 11 are likewise bolted to the angle member 34 by tap bolts 36. A reinforcing member 37 for strengthening and sealing the corners of the enclosure 11 is disposed between the flange 33 and the angle 34. A gasket 38 is provided between the flange 33 and the member 37. Likewise, a gasket 39 is provided between the sides of the enclosure 11 and the member 37, thereby sealing the corners of the enclosure.

Thus it will be seen that the joint 10 may be completely assembled before it is inserted in position between the end of the bus enclosure 11 and the transformer housing 12. After the joint is assembled it is bolted in position as described hereinbefore. Likewise the entire joint may be easily removed from the structure or the transformer replaced with another unit by disconnecting the flange 21 and slipping the joint together to facilitate the installing of another transformer unit.

The joint may be assembled by first attaching the member 18 to the sleeve 16 and also attaching the member 29 to the sleeve 17. The sleeves 16 and 17 are then telescoped and the member 26 attached to the flange 25 to complete the assembly.

From the foregoing description it is apparent that I have provided a weatherproof joint suitable for connecting enclosures between which there may be some relative movement or misalignment. It may also be utilized as an expansion joint in enclosures where it is essential that moisture be excluded from the enclosures. The joint may be made of material of any desired thickness since no bending action takes place in the material after the joint is constructed.

While the joint herein illustrated is of a rectangular cross section, it will be understood that my invention is not limited thereto as joints of other shapes may be utilized if desired.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A labyrinthic joint for a sheet metal enclosure comprising a pair of rectangular telescoping sleeves, one of said sleeves having a flange thereon of a substantially enclosed rectangular cross section, and having sides substantially parallel to said sleeves, said sleeve extending beyond the terminus of said flange, the other sleeve terminating inside of said flange.

2. A labyrinthic joint for a sheet metal enclosure comprising a pair of telescoping sleeves, one of said sleeves having a flange thereon of a substantially enclosed rectangular cross section, said sleeve extending beyond the terminus of said flange, the other sleeve terminating inside of said flange in a manner forming a substantially enclosed rectangle.

3. A labyrinthic joint for a sheet metal enclosure comprising a pair of telescoping sleeves, one of said sleeves having a flange thereon of a substantially enclosed rectangular cross section, said sleeve extending beyond the terminus of said flange, the other sleeve terminating inside of said flange in a manner forming a substantially enclosed rectangle having sides substantially parallel to the sides of said rectangular flange.

4. An expansion joint for joining enclosures together comprising, a pair of tubular members disposed in telescoping relation, one of said members having a transversely extending flange thereon of substantially enclosed tubular cross section, said member extending beyond the terminus of said flange, the other of said members also having a transversely extending flange thereon of substantially enclosed tubular cross section, said flanges being disposed in interlocking relation with the terminus of each flange disposed within the other flange.

HAROLD H. RUGG.